United States Patent
Young

[11] Patent Number: 5,290,988
[45] Date of Patent: Mar. 1, 1994

[54] METHOD FOR MACHINING A PRECISION CONFORMED HOLD-DOWN PRESSURE SHOE

[75] Inventor: Clinton L. Young, East Peoria, Ill.

[73] Assignee: Precision Pattern, Template & Shoe, Inc., East Peoria, Ill.

[21] Appl. No.: 659,493

[22] Filed: Feb. 22, 1991

[51] Int. Cl.⁵ .............................................. B23H 9/00
[52] U.S. Cl. .............................. 219/69.17; 83/76.1;
83/651.1; 144/134 R; 144/144 R; 144/356;
364/474.02
[58] Field of Search ................. 219/69.12, 69.17;
83/72, 75.5, 76.1, 76.8, 171, 651.1; 144/144 R,
356, 253 F, 253 G, 253 H, 134 R, 145 R, 162 R,
145 A; 269/316, 317; 364/474.02, 474.03,
474.04, 474.08; 409/137

[56] References Cited

U.S. PATENT DOCUMENTS

| | | | |
|---|---|---|---|
| 2,591,552 | 4/1952 | Keef | 269/63 |
| 2,699,601 | 1/1955 | Darnell | 269/40 |
| 2,776,683 | 1/1957 | Cowley | 269/246 |
| 3,202,023 | 8/1965 | Parker | 81/421 |
| 3,668,956 | 6/1972 | Whipple et al. | 83/565 |
| 3,680,611 | 8/1972 | Mitten et al. | 144/162 R |
| 3,865,162 | 2/1975 | Schmidt | 144/144 R |
| 3,885,612 | 5/1975 | Schell | 144/145 R |
| 4,248,282 | 2/1981 | Waldron et al. | 144/144 R |
| 4,430,718 | 2/1984 | Hendren | 83/171 |
| 4,445,553 | 5/1984 | Hanyzewski et al. | 144/145 A |
| 4,514,122 | 4/1985 | Campbell | 144/144 R |
| 4,517,870 | 5/1985 | Kopp | 83/522.18 |
| 4,675,825 | 6/1987 | DeMenthon | 219/69.12 |
| 4,734,173 | 3/1988 | Walter et al. | 219/69.17 |
| 4,739,487 | 4/1988 | Bonnet et al. | 364/474.08 |
| 4,825,920 | 5/1989 | Evitts | 409/137 |
| 4,866,630 | 9/1989 | Beaman et al. | 364/474.02 |
| 4,877,227 | 10/1989 | Sassella et al. | 269/43 |
| 4,937,415 | 6/1990 | Mitchell | 219/69.17 |
| 4,941,100 | 7/1990 | McFarlane et al. | 83/76.8 |
| 4,953,602 | 9/1990 | Smith | 144/349 |
| 5,002,104 | 3/1991 | Stewart | 144/230 |
| 5,019,993 | 5/1991 | Montalcini et al. | 364/474.03 |
| 5,031,483 | 7/1991 | Weaver | 76/107.1 |
| 5,090,460 | 2/1992 | Gemmani | 144/134 R |
| 5,146,962 | 9/1992 | Drees | 144/144 R |

*Primary Examiner*—Geoffrey S. Evans
*Attorney, Agent, or Firm*—Laff, Whitesel, Conte & Saret

[57] ABSTRACT

A method for machining a hold-down pressure shoe that conforms to a preselected pattern on a workpiece for firmly maintaining the workpiece against a surface of a machine so that the workpiece may be moved adjacent a rotating cutterhead without elevating it from the surface, comprising the steps of: programming a computer to control a cutting means for shaping the preselected pattern; and operating the cutting means to cut the hold-down pressure shoe into a shape which corresponds with the preselected pattern.

8 Claims, 2 Drawing Sheets

METHOD FOR MACHINING A PRECISION CONFORMED HOLD-DOWN PRESSURE SHOE

FIELD OF THE INVENTION

This invention relates to a method for machining a hold-down pressure shoe and to the shoe produced by this method. More particularly, this invention relates to a method for machining a hold-down pressure shoe that conforms precisely to a preselected pattern on a workpiece and further relates to the shoe that is manufactured by this method.

BACKGROUND OF THIS INVENTION

The production of molded or patterned wood generally involves exposing a piece of material or a workpiece to a rapidly rotating cutterhead blade (or blades) which cuts, shapes and conforms the workpiece into a specific shape or molded pattern. While the workpiece feeds into and is molded by the cutterhead blade(s), certain difficulties are often encountered. For example, the cutterhead blade (or blades) has a propensity to elevate the workpiece during the cutting process and accordingly, causes the workpiece to be pulled into and pushed away from the cutter which causes knife or chatter marks along the length of the molding and sniping along its ends. Attempts have therefore been made to eliminate these and other related problems by applying pressure to the workpiece during the cutting and shaping process with a hold-down pressure shoe.

A variety of prior art hold-down pressure shoes are known in the milling industry, including wood, plastic and steel shoes. However, these pressure shoes do not effectively resolve the aforementioned problems. Their ineffectiveness is due, in part, to poor contact between the pressure shoe and the workpiece. Specifically, the surface of the pressure shoe that contacts the workpiece does not precisely conform to the detail of the pattern on the workpiece. Instead, the pressure shoe contacts only selective areas on the surface of the workpiece. This irregular contact between the surfaces of the pressure shoe and the workpiece causes the chatter, sniping and fly-away problems of the cutterhead blade.

The prior art shoes were inadequate as it was not known that a precise fit between the surfaces of the pressure shoe and the workpiece was necessary during the cutting and shaping process. In contrast, the prior art pressure shoes included surfaces that imprecisely conformed to the pattern on the workpiece. These prior art pressure shoes and the methods and materials used in their production are described in greater detail hereafter.

Wood pressure shoes are widely used in the industry and are made by one of two methods. The wood pressure shoes in both methods are easily worn and damaged, cause distinct pressure marks and marring on the workpiece, and are susceptible to wood chip or sawdust build-up and resin in the wood.

The first method is known as reverse pattern shoes and involves manually grinding a cutting blade to match a template and then exposing a section of workpiece to the blade to produce a piece of molded wood that is cut into shoe blanks. This method is inaccurate in that the templates and, likewise, the cutting blades are hand filed and are therefore, at best, only approximations of the original pattern.

A second method involves producing wood shoes by table sawing, dadoeing or routing to create a shoe that allegedly conforms to the pattern on the workpiece. This method, however, is also inaccurate in that the dimensions of the shoes are mere approximations.

Another known method involves casting plastic cast shoes to a wood sample. Both the method and the product are inaccurate due to wide variations in the casting patterns. Moreover, this method creates distinguishable pressure marks on the workpiece.

Finally, two further methods involve steel pressure shoes which may be milled or used in an uncut form. A milled pressure shoe may be produced on a vertical or horizontal milling machine. Although milled steel pressure shoes wear well and are not as susceptible to damage as other shoe materials, it is difficult to obtain and transpose accurate dimensions of the design pattern to the steel for the milling process. Furthermore, the surface of the milled shoe generally is limited to its points of contact with the and this causes pressure marks and damage to the molded workpiece. Moreover, the milling process creates a rough finish which causes sawdust build-up.

Alternately, a steel flat or ground hold-down pressure shoe may be used in its uncut form. Steel flat pressure shoes are generally rectangular in shape and are not conformed to the molded workpiece. Furthermore, these shoes contact only the highest point on a detailed pattern. Because it is generally recommended that there be a minimum of 70% contact between the shoe and the workpiece, the steel shoes are only adequate for a or workpiece with a non-detailed or flat pattern.

Despite the numerous disadvantages with the above-mentioned hold-down pressure shoes, these shoes are still widely used in the construction industry. Thus, while these shoes apply pressure to a workpiece during the cutting and shaping process, they do not effectively resolve any of the aforementioned problems.

Accordingly, an object of the invention is to provide a hold-down pressure shoe that conforms precisely to the detail of a preselected pattern on a workpiece.

Another object of the present invention is to provide a hold-down pressure shoe that evenly distributes pressure on the surface of a workpiece that is being shaped during the cutting and shaping process.

Another object of the invention is to provide a hold-down pressure shoe that limits the movement of the workpiece as it feeds through the cutterhead, thereby eliminating end sniping, blade or chatter marks and pressure marks on the workpiece.

Another object of the invention is to provide a hold-down pressure shoe that increases the quality of the pattern on the workpiece by stabilizing the workpiece and maintaining it in its proper cutting plane.

Another object of the invention is to provide a hold-down pressure shoe that permits increased linear footage output (feed speed) on the wood molder machine without chatter, sniping and other related problems.

Another object of the invention is to provide a hold-down pressure shoe that precisely matches the profile of the cutterhead blade and/or template.

Another object of the invention is to provide a hold-down pressure shoe that is machined on the same machine as the cutterhead blade and/or the template which is used to make the pressure shoe and the blade.

Yet another object of the invention is to provide a hold-down pressure shoe that may be used with a variety of different machines.

A further object of the invention is to provide a hold-down pressure shoe that has a long life expectancy and requires little or no maintenance.

SUMMARY OF THE INVENTION

The present invention, in a first embodiment, comprises an apparatus that accomplishes the foregoing objects by providing a hold-down pressure shoe that uniformly engages and precisely conforms to an external contour of a surface, including any 360° surface, of a workpiece. The hold-down pressure shoe, in a first embodiment, is machined on a computer numerical controlled (CNC) electrical discharge machine (EDM) wire cutter to cut or conform at least one surface of the shoe into a shape that is the negative profile of a preselected pattern on a workpiece. The shoe may then be directly mounted to an adaptor plate that has previously been machined and manufactured to fit a variety of wood molder machines.

In a second embodiment, prior to machining the pressure shoe, a template is first machined by the CNC EDM wire cutter to conform its profile to a preselected pattern on a workpiece. After it has been determined that the template conforms to the pattern on the workpiece, the hold-down pressure shoe is machined by the CNC EDM wire cutter. In this embodiment, it is not necessary for the template to exactly conform to the pattern on the workpiece. All that is required is that the profile of the template precisely conform to the negative profile of the hold-down pressure shoe.

In addition to the steps enumerated in the first and second embodiments, a third embodiment further involves precutting the cutterhead blade by the CNC EDM wire cutter so that it too precisely conforms to the template and the negative profile of the hold-down device. This embodiment provides a precise and accurate relationship between all the different components.

Thus, the invention, in all of the embodiments, provides for a method for machining a hold-down pressure shoe that may be used with a variety of machines, including a wood molder machine, wherein a surface of the shoe is the negative profile of the workpiece whereby it uniformly engages and precisely conforms to an external contour of a surface, including any 360° surface, of the workpiece to firmly maintain the workpiece against a surface of the machine so that the workpiece may move adjacent a rotating cutting head without elevating from the surface. The pressure shoe, in a first embodiment, is machined by a CNC EDM wire cutter which conforms the hold-down shoe to a preselected pattern on the workpiece. The template and precutting of the blade may also be machined with the same wire cutter and computer program, in a second and third embodiment, respectively.

The above, as well as other objects and advantages of the invention, will become apparent from the following detailed description of the embodiments, reference being made to the accompanying drawings.

DETAILED DESCRIPTION OF THE INVENTION

Figure 1:
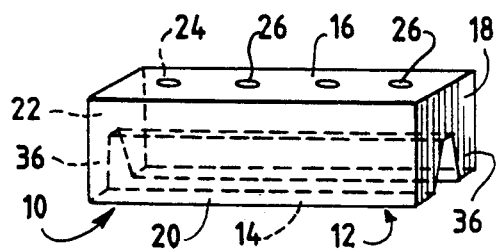
FIG. 1 is a perspective view of the inventive hold-down pressure shoe.

Generally referring to FIG. 1, the invention in all of the embodiments provides a device or hold-down pressure shoe generally denoted by the numeral 10 having, in part, a square or rectangular body 12 comprising a base 14, a top surface 16, and a first, second, third and fourth side, 18, 20, 22, 24, respectively. A plurality of bolt openings 26 are located on top surface 16 and provide a means to connect shoe 10 to an adapter plate 40 (see FIGS. 4-6). Shoe 10 may be used singularly (see FIG. 10) or in multiples (see FIGS. 5-6) or in any number of combinations thereof. The base 14 and/or top surface 16 of shoe 10 conforms to a preselected pattern on a workpiece 28 (see FIG. 4) which will be described in greater detail hereinafter.

Figure 3:
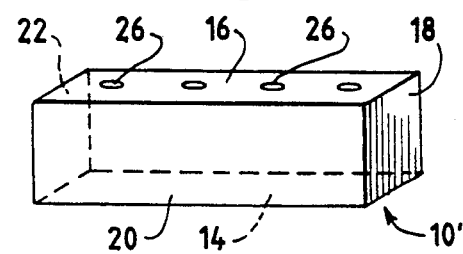
FIG. 3 is a perspective view of the shoe of FIG. 1, illustrating its appearance prior to machining by the wire cutter.
Figure 2:
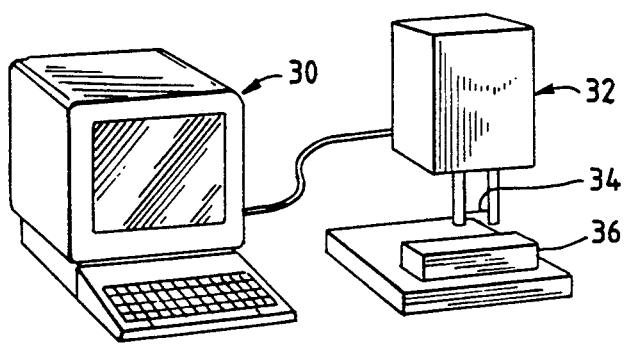
FIG. 2 is a perspective view of the CAD-CAM computer and the wire cutter which are used in the inventive method to produce the shoe of FIG. 1.

Referring first to FIGS. 1-3, in a first embodiment, shoe 10 is machined by a method which involves initially programming a computer aided design-computer aided manufacture (CAD-CAM) computer 30 with a preselected pattern for a workpiece. The computer program generates cutting and shaping instructions to a conventional computer numerical controlled (CNC) electrical discharge machine (EDM) wire cutter 32. Alternatively, shoe 10 may be machined by inputting pre-calculated "x" and "y" coordinate commands to the electrical discharge machine. In either situation, shoe 10 is then cut or machined by the wire cutter in accordance with the computer generated instructions.

Figure 4:
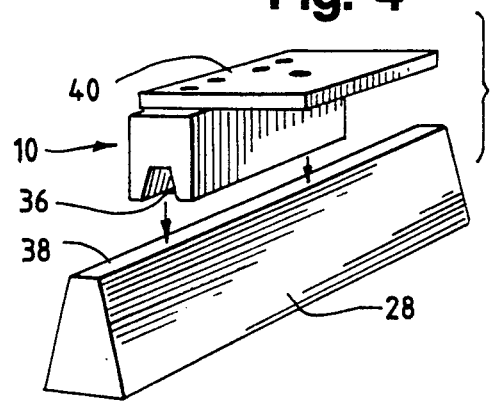
FIG. 4 is a perspective view of the shoe of FIG. 1, illustrating the conformity of its lower surface to the pattern on a workpiece.

Specifically, shoe 10 is made by placing a shoe blank 10' (see FIG. 3) on the wire cutter. Pursuant to computer generated instructions, the wire cutter uses a continuous wire electrode 34 to machine shoe blank 10' into a shape that is the negative profile of the preselected pattern that is generated by the computer. As shown in FIGS. 1 and 4, after shoe blank 10' has been machined by wire cutter 32, one or more of its surfaces will 36 conform to the computer programmed pattern and to the profile of the pattern 38 on workpiece 28. For purposes of illustration in FIGS. 1 and 5, only base 14 has been machined by the wire cutter. Moreover, the invention herein has been described in relation to a workpiece having an extremely simple pattern. However, it should be understood that this invention also applies to very complex patterns on the workpiece.

Figure 8:
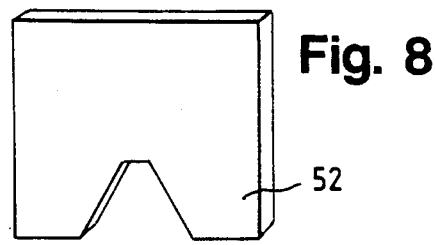
FIG. 8 is a perspective view of a template which is made by the inventive method in another embodiment.

In a second embodiment, a template 52 is machined by the CNC EDM wire cutter before the machining of shoe 10'. The template (see FIG. 8) is cut by the wire electrode of the wire cutter in a similar manner to that described in relation to the shoe in the first embodiment.

Specifically, the computer generates instructions to the wire electrode which cuts template 52 into the shape of the preselected pattern. The dimensions of the cut template correspond to the axial constants of the preselected pattern which were programmed into the computer. After the template has been machined, the shoe is then machined by the wire cutter so that it precisely conforms to the negative profile of template.

Figure 9:
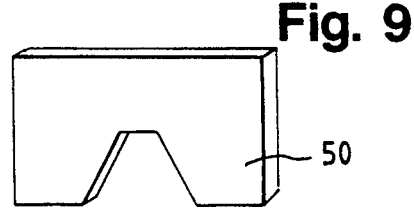
FIG. 9 is a perspective view of a cutterhead blade which is made by the inventive method in yet another embodiment.

A third embodiment involves precutting a first blade 50 (see FIG. 9) with the same wire cutter used to machine the shoe 10 of the first embodiment and template 52 of the second embodiment. Precutting the blade involves squaring its ends and rough cutting the detailed sections. The dimensions of cut blade 50 may be compared to the dimensions of the template to determine the accuracy of the cut. Alternatively, the blade may be machined without comparing its dimensions to the template. Whatever method is used to determine the accuracy of the blade, after first blade 50 is pre-cut by the wire cutter, the cutting portion of blade 40 is manually beveled to provide the blade with a sharp cutting edge. The profile of first blade 50 precisely conforms to the negative profile of shoe 10, the profile of the preselected pattern on workpiece 28 and optionally, to the profile of template 52.

Figure 5:
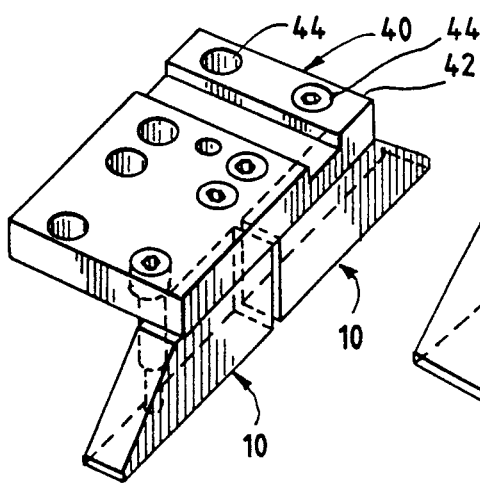
FIG. 5 is perspective view of a pair of hold-down pressure shoes that are attached to an adapter plate.
Figure 6:
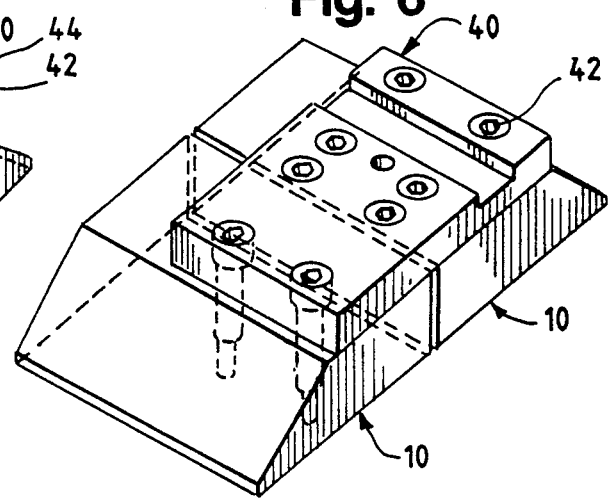
FIG. 6 is a perspective view of another pair of hold-down pressure shoes that are attached to an adapter plate.

Referring to FIGS. 4-6, after the machining of the shoe in each of the above embodiments, shoe 10 may be mounted to an adapter plate 40 with bolts 42 which are inserted into bolt openings 44 and are spaced in a uniform bolt pattern to enable shoe 10 to be interchanged with different adapter plates from other machines. Bolts 42 extend through adapter plate 40 and into shoe 10 through openings 44 and 26, respectively. As FIGS. 5-6 illustrate, shoe 10 may assume a variety of sizes and still attach to adapter plate 40.

Figure 7:
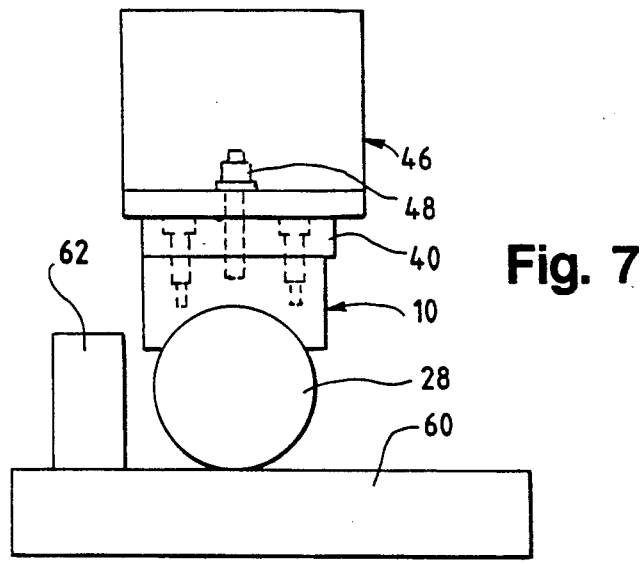
FIG. 7 is an end plan view of the shoe of FIG. 1 as it appears mounted to a molder machine.

Referring then to FIG. 7, adapter plate 40 and shoe 10 are mounted to a molder mount bracket 46 of the machine by large bolt 48 which extends perpendicularly through plate 40 and into shoe 10. Alternatively, shoe 10 may be mounted directly to bracket 46 without adapter plate 40.

Figure 10:
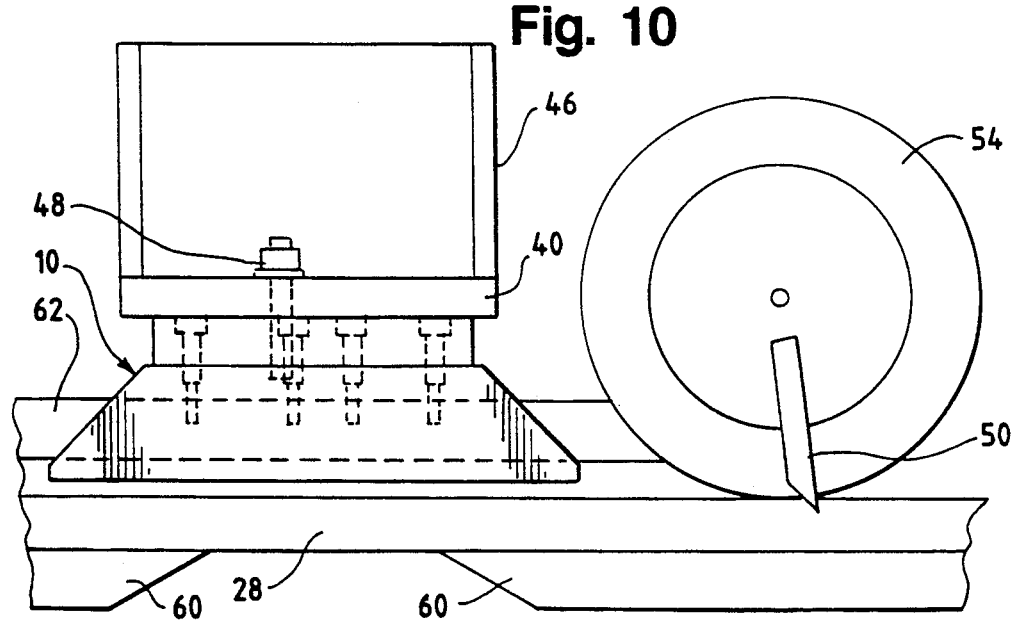
FIG. 10 is a side plan view of the shoe of FIG. 1 as it appears mounted to the molder machine of FIG. 7.

FIGS. 7 and 10 illustrate the CNC EDM machined shoe and adapter plate 40 as they appear, mounted by bolt 48 to bracket 46 of the wood molder machine. First blade 50 is mounted in a circular cutter head 54 which is located on the molder machine above workpiece 28. A second blade (not shown) may be mounted in another circular cutter head 58 which is located beneath workpiece 28. The second blade is machined in the same manner described in relation to first blade 50. Likewise, a second shoe (not shown) may be mounted to the molder machine and used in conjunction with the second blade. A workpiece is placed on and parallel to the bedplate 60 and is fed through a roller mechanism (not shown) that pushes the workpiece into contact with the first blade of cutterhead 54, and, if needed, with the second blade of cutterhead 54. First and second blades 50 may rotate in a clockwise or counterclockwise direction, depending upon the design of the machine, and cut the external surfaces of workpiece 28 into the preselected pattern. As workpiece 28 is cut by the blade, it continuously moves beneath shoe 10 until the entire length of workpiece 28 has been cut. A fence 62 serves as a guiding mechanism and is perpendicular to bedplate 60 and parallel to workpiece 28.

The material from which pressure shoe 10 is constructed includes any electrically conductive metal or composite material including, but not limited to, steel.

Moreover, shoe 10 has not been described in terms of approximate measurements, as it should be understood that the size of shoe 10 may vary according to need.

Therefore, it should be recognized that, while the invention has been described in relation to a preferred embodiment thereof, these skilled in the art may develop a wide variation of structural details without departing from the principles of the invention. Accordingly, the appended claims are to be construed to cover all equivalents falling within the true scope and spirit of the invention.

The invention claimed is:

1. A method for preparing a hold-down pressure shoe that uniformly engages and precisely conforms to an external contour of a workpiece surface so that the workpiece surface may be moved adjacent a rotating cutterhead blade of a machine without elevating it from the surface of the machine, comprising the steps of:

selecting a pattern for the workpiece surface;

programming a computer to control a cutting means for shaping the selected pattern on the workpiece surface; and operating the cutting means to cut the hold-down pressure shoe into a shape that is the negative profile of the selected pattern on the workpiece surface.

2. The method of claim 1 wherein prior to cutting the hold-down pressure shoe, the cutting means is operated to cut a template into a shape having dimensions that correspond with the selected pattern, and then using the dimensions of the cut template to make the hold-down pressure shoe.

3. The method of claim 1 wherein the cutting means is a computer numerical controlled electrical discharge machine wire cutter.

4. The method of claim 1 wherein the machine is a wood molder.

5. A method for preparing a hold-down pressure shoe that firmly maintains a workpiece against a surface of a machine so that the workpiece may be moved adjacent a rotating cutterhead blade without elevating it from the surface, comprising the steps of:

selecting a pattern;

programming a computer to control a cutting means for shaping the selected pattern; and operating the cutter means to cut the hold-down pressure shoe into a shape that is the negative profile of the selected pattern, wherein prior to cutting the hold-down pressure shoe, the cutting means is operated to cut a template into a shape having dimensions that correspond with the selected pattern, and then using the dimensions of the cut template to make the hold-down pressure shoe; and operating the cutting means to precut the cutterhead blade into a shape that corresponds with the shape of the template.

6. A method for preparing a hold-down pressure shoe that uniformly engages and precisely conforms to an external contour of a workpiece surface so that the workpiece may be moved adjacent a rotating cutterhead blade of a machine without elevating it from the surface of the machine, comprising the steps of:

selecting a pattern for the workpiece surface;

programming a computer to control a cutting means for shaping the selected pattern on the workpiece surface;

operating the cutting means to cut a template into a shape that corresponds with the selected pattern on the workpiece surface; and operating the cutting means to cut the hold-down pressure shoe into a shape that is the negative profile of the shape and dimensions of the template.

7. A method for preparing a hold-down pressure shoe that firmly maintains a workpiece against a surface of a machine so that the workpiece may be moved adjacent a rotating cutterhead blade without elevating it from the surface, comprising the steps of:

selecting a pattern;

programming a computer to control a cutting means for shaping the selected pattern;

operating the cutting means to cut a template into a shape which corresponds with the selected pattern;

operating the cutting means to cut the hold-down pressure shoe into a shape that is the negative profile of the shape and dimensions of the template; and operating the cutting means to pre-cut the cutterhead blade into a shape which corresponds with the shape of the template.

8. A method for preparing a hold-down pressure shoe and using the hold-down pressure shoe to firmly maintain a workpiece against a surface of a machine so that the workpiece may be moved adjacent a rotating cutterhead blade without elevating it from the surface, comprising the steps of:

selecting a pattern;

programming a computer to control a cutting means for shaping the selected pattern;

operating the cutting means to cut the hold-down pressure shoe into a shape that is the negative profile of the selected pattern; and operating the rotating cutterhead blade to cut the workpiece into the selected pattern while simultaneously positioning the cut hold-down pressure shoe adjacent said workpiece such that it continually engages said workpiece during cutting.

* * * * *

UNITED STATES PATENT AND TRADEMARK OFFICE
CERTIFICATE OF CORRECTION

PATENT NO. :     5,290,988
DATED       :     March 1, 1994
INVENTOR(S) :    Young It is certified that error appears in the above-identified patent and that said Letters Patent is hereby corrected as shown below:

Col. 2, line 18, insert "workpiece" after the and "this" should be "thus".

Col. 4, line 55, "will 36" should read --36 will--

Col. 5, line 8, insert "the" after "of".

Claim 5, line 47, "cutter" should be "cutting".

Signed and Sealed this

Second Day of August, 1994

Attest:

BRUCE LEHMAN

Attesting Officer        Commissioner of Patents and Trademarks